United States Patent [19] [11] 4,247,401
Bloch et al. [45] Jan. 27, 1981

[54] REVERSE OSMOSIS SEPARATION PROCESS USING POROUS ASYMMETRIC ACETYL CELLULOSE MEMBRANE

[75] Inventors: Rene Bloch; Jacov Yonath, both of Rehovot, Israel

[73] Assignee: Aligena A.G., Basel, Switzerland

[21] Appl. No.: 938,496

[22] Filed: Aug. 31, 1978

Related U.S. Application Data

[63] Continuation of Ser. No. 651,593, Jan. 22, 1976, abandoned.

[51] Int. Cl.³ .............................................. B01D 13/00
[52] U.S. Cl. .................................. 210/638; 210/651; 210/655; 210/500.2
[58] Field of Search ............ 210/76, 22, 500 M, 23 H; 536/76; 521/27

[56] References Cited

U.S. PATENT DOCUMENTS

| 3,228,876 | 1/1966 | Mahon | 210/22 |
| 3,497,072 | 2/1970 | Cannon | 210/500 M |
| 3,557,073 | 1/1971 | Kay | 536/76 X |
| 3,647,086 | 3/1972 | Mizutani et al. | 521/27 X |
| 3,723,306 | 3/1973 | Bridgeford | 210/22 |
| 3,824,150 | 7/1974 | Lilly et al. | 195/63 |

Primary Examiner—Frank A. Spear, Jr.
Attorney, Agent, or Firm—Wenderoth, Lind & Ponack

[57] ABSTRACT

A method for the separation of organic or metallo-organic substances from salts by reverse osmosis is provided. The membranes used are asymmetric acetyl cellulose membranes modified by covalently bonded residues of reactive dyestuffs containing ionizable groups. The diameter of the pores on the surface of the membrane is 5 to 100 Å.

5 Claims, No Drawings

REVERSE OSMOSIS SEPARATION PROCESS USING POROUS ASYMMETRIC ACETYL CELLULOSE MEMBRANE

This application is a continuation of application Ser. No. 651,593, filed Jan. 22, 1976, now abandoned.

BACKGROUND OF THE INVENTION

It is known that asymmetric membranes can be used for the separation of ionogenic substances from, for example, aqueous solutions. The performance of such a separation, also called reverse osmosis, depends on the one hand on the nature and size of the pores, especially those of the membrane surfaces, and on the other hand on the nature and the molecular size of the ionogenic substance, i.e. the ions. The known asymmetric membranes are practically uncharged, as they do not have any ionizable groups.

Asymmetric membranes consist of a supporting main layer and of a covering layer or skin which is on one side thereof and which is usually between $\frac{1}{2}\mu$ and $3\mu$ thick. The size of the pores in the skin is important for the properties of the membrane as a separator.

Membranes with ionizable groups are also known, for example those derived from polyvinylsulfonic acids. They allow, however, even water to permeate only slowly and are permeable either for cations or anions, depending on the membrane charge, and are not asymmetric. They are used especially as ion exchange membranes in electro-dialysis.

SUMMARY OF THE INVENTION

It is the object of the present invention to provide a membrane which can be used for the separation of certain ionogenic substances from their solutions or from other ionogenic substances. The invention therefore provides a porous asymmetric membrane substantially consisting of acetyl cellulose material, modified by residues containing ionizable groups, said membrane having on one side a skin with homogeneous pores having a diameter of 5–100 Å, preferably of 5–50 Å.

The separation effect which can be achieved with such membranes does not depend only on the pore size and the nature of the ions, but also on the electric charge of the membrane and of the ions.

At least the skin of the membrane is modified by residues containing ionizable groups.

DETAILED DESCRIPTION OF THE INVENTION

Acetyl cellulose contains hydroxyl groups as reactable groups and can be reacted with suitable reagents which on the one hand contain ionizable groups and on the other hand groups that can react with hydroxyl groups to form a covalent bond.

Preferred acetyl celluloses are the so-called 2½ acetate or acetate with a small degree of acylation.

Suitable reagents which contain an ionizable group and the radical that forms a bridge member between this group and the acetyl cellulose, are colourless or coloured compounds, for example ionogenic reactive dyes which belong to various groups, e.g. anthraquinone, or acyl or azo dyes. The following group can be mentioned as examples of reactive groups which make possible the binding of these reagents to the starting polymer:

carboxylic acid halide groups,
sulfonic acid halide groups,
residue of $\alpha,\beta$-unsaturated carboxylic acids, for instance of acrylic acid, methacrylic acid, $\alpha$-chloroacrylic acid, $\alpha$-bromoacrylic acid,
residues of preferably low haloalkylcarboxylic acids, for instance chloroacetic acid, $\alpha,\beta$-dichloropropionic acid, $\alpha,\beta$-dibromopropionic acid,
residues of fluorocyclobutanecarboxylic acids, for example tri- or tetrafluorocyclobutanecarboxylic acid,
residues with vinylacyl groups, for instance vinylsulfone groups or carboxyvinyl groups,
pyrimidine or 1,3,5-triazine residues.

As ionizable groups, the membrane-forming polymeric substance and the membrane may contain for instance sulfato groups, sulfonic acid groups, sulfonic acid amide groups, carboxylic acid groups, carboxylic acid amide groups, ammonium groups formed by primary, secondary or tertiary amino groups and hydrogen, or qaternary ammonium groups. Especially good results are obtained in many cases with substances containing sulfonic acid groups. Especially useful and applicable for many purposes are membranes the polymeric materials of which at least on the membrane surface, consist of a polymer modified by an azo dye which contains sulfonic acid groups. The azo dye may contain also complexed metal, for instance copper.

The present invention relates also to the production of membranes of the above described composition. The process comprises reacting the substance of an asymmetric acetyl cellulose membrane with a compound that contains at least one ionogenic group and at least one reactive group which can form covalent bonds with the reactive groups of the membrane substance, and then annealing the modified membrane by subjecting it to a heat treatment. The pore size of the membrane skin is largely determined by this heat treatment.

The membrane is treated, for example, for 1–30 minutes at a temperature of 60°–90° C., preferably by immersing it in warm water. The heat treatment can also be carried out before reaction with the compound containing the reactive ionizable groups. In addition, the charging can also be performed before the cellulose acetate is transformed into an asymmetric membrane.

Depending on their use, the membranes may have various forms. For example, they may be in the form of a plate, a leaf, a tube, a bag, a cone, or of hollow fibres. If heavy pressure is exerted the membranes can of course be supported by a wire sieve or a perforated plate. In the above defined range the pore size may be modified by treatment at different temperatures also adapted to the intended use. The average charge density of the membrane preferably to 1–100 milli-equivalents of ionizable groups per 1 kg of dry membrane.

The membranes of the present invention can be used in principle for the following purposes:

(a) the separation of charged (ionigenic) molecules from uncharged molecules, especially from those of the same size, (b) the separation of oppositely charged molecules, (c) the separation of charged ionogenic substances with different molecular weights, including those having the same charge.

The following uses are especially advantageous:

(1) The separation of organic and also of metalloorganic ionogenic substances from the by-products of the reaction mixtures and other substances contained therein, for example, of salts, such as sodium chloride, sodium sulfate or sodium acetate.

(2) The separation of heavy metal complexes from salts which do not form complexes, in the treatment of effluents.

(3) The purification of the effluents occuring in production and application of dyestuffs.

(4) The separation of proteins or hormones which have similar molecular weights, but opposite charges.

(5) The separation of ionic tensides (detergents, wetting agents or dispersing agents) from other chemicals which are present in the reaction mixture after production of the tensides. (by-products, excess of starting products)

(6) The removal of ionogenic tensides from effluents.

(7) The separation of ionogenic molecules from water, that is concentration of aqueous solutions that contain metal complexes, tensides, dyes or proteins, whereby better results in respect of efficiency (flow per unit of time) and separation effect are obtained by comparison with the conventional membranes.

The separation effect (the rejection) of the membranes can be measured as follows: A round membrane with a surface area of 13 sq. cm. lying on a fine mesh wire net made of stainless steel, is inserted into a cylindric cell of stainless steel 50 ml of the solution to be investigated which contains the test substance in a concentration $c_1$ (g substance in g solution) is put on the membrane in the steel cylinder and subjected to a nitrogen pressure of 14 bars. The solution is stirred magnetically. The solution on the exit side of the membrane is examined for the concentration of the test substance $c_2$ by withdrawing 3 samples of 5 ml each from the start of the experiment. As a rule the amount of material passing through the membrane and its composition are constant in the 3 samples. From this the rejection $$R = \frac{c_1 - c_2}{c_1} \cdot 100\%$$

can be calculated.

The amount of material passed through the membrane per surface and time unit is:

| $D = V \cdot F^{-1} \cdot t^{-1}$ | D - amount of substance<br>V - volume<br>F - membrane surface<br>t - time |
|---|---| preferably expressed in $m^3 \cdot m^{-2} \cdot d^{-1}$, that is the number of cubic meters per square meter and per day.

EXAMPLE 1

A solution is prepared from 25 g cellulose acetate (Eastman Kodak type 398-10, grade of acetylation 39.8%), 45 g acetone and 30 g formamide. The solution is allowed to stand for 3 days and then poured on to a glass plate and spread with a spatula to a thickness of 0.6 mm. The solvent is allowed to evaporate for 5 seconds at 25° C. The glass plate is then immersed for 2 hours in ice water and the membrane obtained is removed from the glass plate.

The membrane is then immersed in a 5% aqueous solution which contains a 1:2 complex chromium compound of the dyestuff of formula

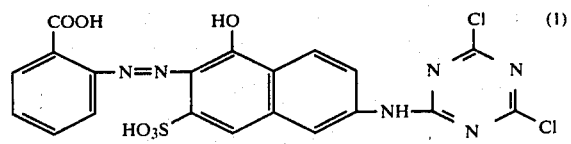

and is left there for 48 hours at a pH of 6 and 25° C. Then the pH of the dye solution is brought to 10.4 by addition of sodium hydroxide and the resulting solution is stirred during 40 minutes at 25° C.

Instead of charging the membrane in two stages with a dye solution, it can also be treated in one stage for 2½ hours at a pH of 10.5 and at 25° C. with a 10% solution of the chromium complex dye.

The subsequent heat treatment (annealing) is effected by immersing the membrane in water at 60° C. for 10 minutes.

The test of a membrane that had been prepared as described above for its separation capability in respect of various substances yielded the values reported in Table I.

TABLE I

| Substance | $c_1$ (%) | R (%) | $D\left(\frac{m^3}{m^2 \cdot days}\right)$ |
|---|---|---|---|
| saccharose | 5.0 | 50 | 2.0 |
| sodium dodecyl sulfate | 0.05 | 85 | 2.2 |
| dyestuff of formula (2) (Example 2) | 0.1 | 98 | 2.4 |
| dyestuff of formula (2) (Example 2) | 0.3 | 97.5 | 1.84 |
| cobalt citrate | 0.02 | 98 | 2.0 |
| lauryl pyridinium chloride | 0.05 | 10 | 1.92 |
| sodium chloride | 0.8 | 20 | 2.0 |
| sodium sulfate | 0.8 | 62 | 1.4 |
| mercury complex of ethylenediaminetetraacetic acid (calculated as Hg) | 0.01 | 98 | 2.08 |
| dyestuff of formula (1) | 0.3 | 99.9 | 1.72 |

EXAMPLE 2

A cellulose acetate membrane is prepared as described in Example 1 and modified with the 1:1 copper complex of the dyestuff of the formula

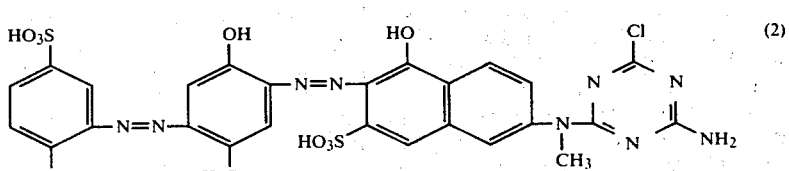

as described in Example 1.

Test results obtained with this membrane are reported in Table II.

TABLE II

| Substance | $c_1$ (%) | R (%) | D $\left(\dfrac{m^3}{m^2 \cdot days}\right)$ |
|---|---|---|---|
| saccharose | 5.0 | 65 | 2.0 |
| dyestuff of formula 2 | 0.3 | 97.5 | 1.84 |
| sodium chloride | 0.8 | 25 | 1.8 |

EXAMPLE 3

A cellulose acetate membrane is prepared as described in Example 1 and modified with 1:1 copper complex of the dyestuff of the formula

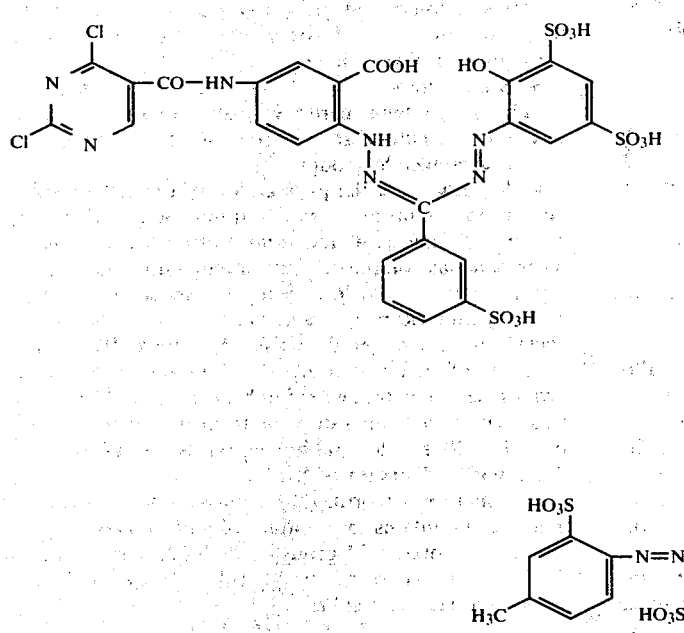

as indicated.

The test results are reported in Table III.

TABLE III

| Substance | $c_1$ (%) | R (%) | D $\left(\dfrac{m^3}{m^2 \cdot days}\right)$ |
|---|---|---|---|
| sodium chloride | 0.8 | 27 | 1.92 |
| dyestuff of formula 2 | 0.3 | 98 | 1.76 |
| copper citrate (calculated as copper) | 0.01 | 99 | 2.04 |

EXAMPLE 4

Procedure as in Example 1, but with the dyestuff of the following formula

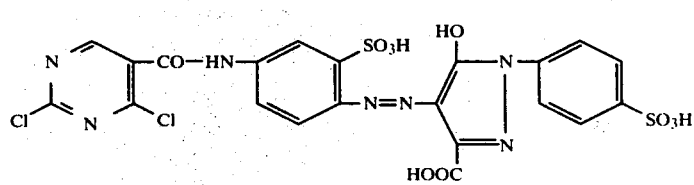
(4)

The test results are reported in Table IV.

TABLE IV

| Substance | $c_1$ (%) | R (%) | D $\left(\dfrac{m^3}{m^2 \cdot days}\right)$ |
|---|---|---|---|
| sodium chloride | 1.0 | 31 | 1.84 |
| copper citrate (calculated as copper) | 0.01 | 98.8 | 1.64 |

EXAMPLE 5

The procedure of Example 1 is repeated with the dyestuff of formula

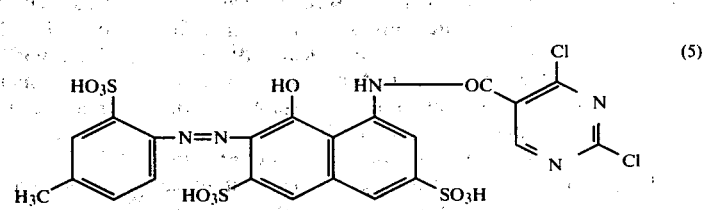
(5)

The results are reported in Table V.

TABLE V

| Substance | $c_1$ (%) | R (%) | D $\left(\dfrac{m^3}{m^2 \cdot days}\right)$ |
|---|---|---|---|
| sodium chloride | 0.8 | 30 | 1.64 |
| copper citrate (calculated as copper) | 0.01 | 92 | 1.80 |

EXAMPLE 6

Procedure as in Example 1, but with the dyestuff of formula

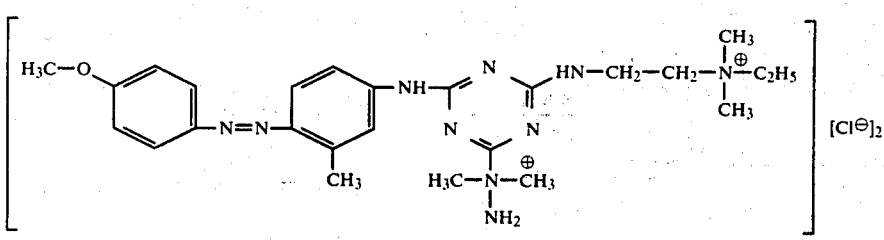

In contradistinction to Examples 1-5, a positively charged membrane is obtained which also shows a good utility, as is evident from the test results reported in Table VI.

TABLE VI

| Substance | $c_1$ (%) | R (%) | $D\left(\dfrac{m^3}{m^2 \cdot days}\right)$ |
|---|---|---|---|
| lauryl pyridinium chloride | 0.05 | 85 | 1.60 |
| saccharose | 0.5 | 3 | 2.20 |
| sodium chloride | 0.8 | 25 | 1.50 |
| sodium sulfite | 0.8 | 35 | 1.50 |
| sodium dodecyl sulfate | 0.05 | 61 | 1.36 |

We claim:

1. A method for the separation of organic or metallo-organic ionogenic substances from salts by reverse osmosis which comprises applying pressure on an aqueous composition containing the said organic or metallo-organic ionogenic substances and salts dissolved therein, the said aqueous composition being in contact with a porous asymmetric membrane substantially consisting of acetyl cellulose material modified by covalently bonded residues of reactive dyestuffs containing ionizable groups, said membrane having been subjected to a heat treatment at a temperature of from 60° to 90° C. for from 1 to 30 minutes and having on its surface uniform pores with a diameter of 5-50 Å.

2. A method according to claim 1, wherein the said membrane contains the residues of an azo dyestuff that contains sulfonic acid groups which are connected to the remaining part of the acetyl cellulose molecule through a triazine residue.

3. A method according to claim 1, wherein the said membrane contains carboxylic acid groups, sulfonic acid groups, amino groups or quaternary ammonium groups as ionizable groups.

4. A method for the purification of the effluents occurring in the production and application of dyestuffs by reverse osmosis which comprises applying pressure on an aqueous composition containing said effluents, the said aqueous composition being in contact with a porous asymmetric membrane substantially consisting of acetyl cellulose material modified by covalently bonded residues of reactive dyestuffs containing ionizable groups, said membrane having been subjected to a heat treatment at a temperature of from 60° to 90° C. for from 1 to 30 minutes and having on its surface uniform pores with a diameter of 5-50 Å.

5. A method according to claim 4, wherein the said membrane contains the residues of an azo dyestuff that contains sulfonic acid groups which are connected to the remaining part of the acetyl cellulose molecule through a triazine residue.

* * * * *